(No Model.)
S. P. M. TASKER.
Diving Apparatus.
No. 237,141. Patented Feb. 1, 1881.
Fig. 1.
Fig. 2.
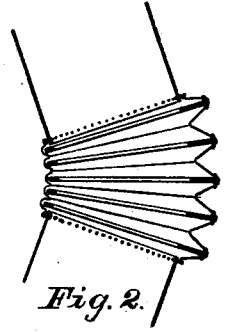
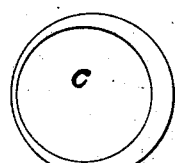
Fig. 3.
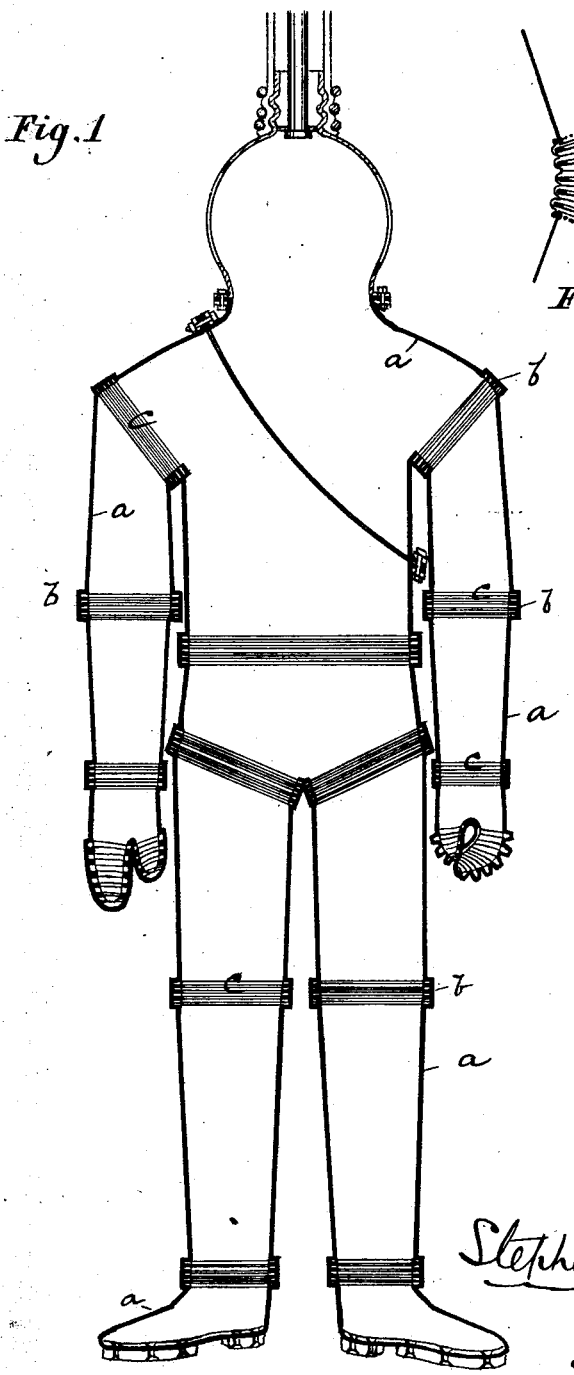
Witnesses.
John Jolley
Ashbel E. Ware.
Stephen P. M. Tasker
Inventor.
By his Attorneys,
W. C. Strawbridge
J. Bonsall Taylor

UNITED STATES PATENT OFFICE.

STEPHEN P. M. TASKER, OF PHILADELPHIA, PENNSYLVANIA.

DIVING APPARATUS.

SPECIFICATION forming part of Letters Patent No. 237,141, dated February 1, 1881.

Application filed November 13, 1880. (No model.)

*To all whom it may concern:*

Be it known that I, STEPHEN P. M. TASKER, of Philadelphia, Pennsylvania, have invented an Improvement in Diving Apparatus, of which the following is a specification.

My invention relates to that class of submarine diving suits or armors which are conformed to the shape of the human body and composed of unjointed sections connected together by flexible joints corresponding to the joints of the body, the unjointed sections being rigid and the joints composed of flat rings covered by flexible material, arranged in bellows structure and united to the contiguous rigid sections.

A diving-armor of the character above referred to was first invented by me, and forms the subject-matter of an application for patent which was executed by me on the 15th day of June, 1880, and filed in the United States Patent Office on the 21st day of June, 1880.

In my former invention the flexible material which formed the bellows portions of the armor extended over the unjointed metallic sections, so as to be practically continuous over the entire suit.

My present invention accords in structure and arrangement of joints with my former invention; and it consists in a diving suit or armor conformed to the shape of the human body and composed of unjointed sections of hardened rubber or kindred material and of connecting bellows-joints of pliable rubber or kindred material, the metal sections of my former invention being dispensed with.

In the accompanying drawings, Figure 1 is a central sectional elevation of a diving apparatus embodying my invention, and consisting of unjointed sections of hardened rubber, and of joints conformed to the joints of the human body, of pliable rubber, formed with flat rings; Fig. 2, an enlarged sectional detail, showing the form of a single-acting bellows-joint expanded; Fig. 3, a plan of a form of ring conveniently employed in the construction of a single-acting bellows-joint.

Similar letters of reference indicate corresponding parts.

The advantages incident to the material which I employ are that it possesses the twofold characteristics of strength to resist external water-pressures and imperviousness to water.

In the drawings, *a* represents the unjointed sections, which are composed solely of rubber or kindred vulcanizable material, vulcanized to the required hardness.

*b* represents the bellows material forming the joints, and composed of india-rubber in pliable condition—that is to say, not treated in such manner as to be rendered hard, as are the unjointed sections, but so treated as to remain in a pliable condition.

*c* are the rings employed to form, in connection with the bellows material, the joints of the armor. The bellows material is united to the rings by wire-stitching or the like.

I contemplate the practical construction of my suit by such method as is most convenient.

Having thus described my invention, I claim and desire to secure by Letters Patent of the United States—

1. A diving suit or armor conformed to the shape of the human body, and composed of unjointed sections of hardened rubber or kindred material and of connecting bellows-joints of pliable rubber or kindred material.

2. A diving suit or armor conformed to the shape of the human body, and composed of unjointed sections of hardened rubber or kindred material and of connecting-joints formed of flat rings covered by bellows-flaps of pliable rubber or kindred material.

In testimony whereof I have hereunto signed my name this 12th day of November, A. D. 1880.

STEPHEN P. M. TASKER.

In presence of—
   J. BONSALL TAYLOR,
   JOHN JOLLEY, Jr.